Figure 1:
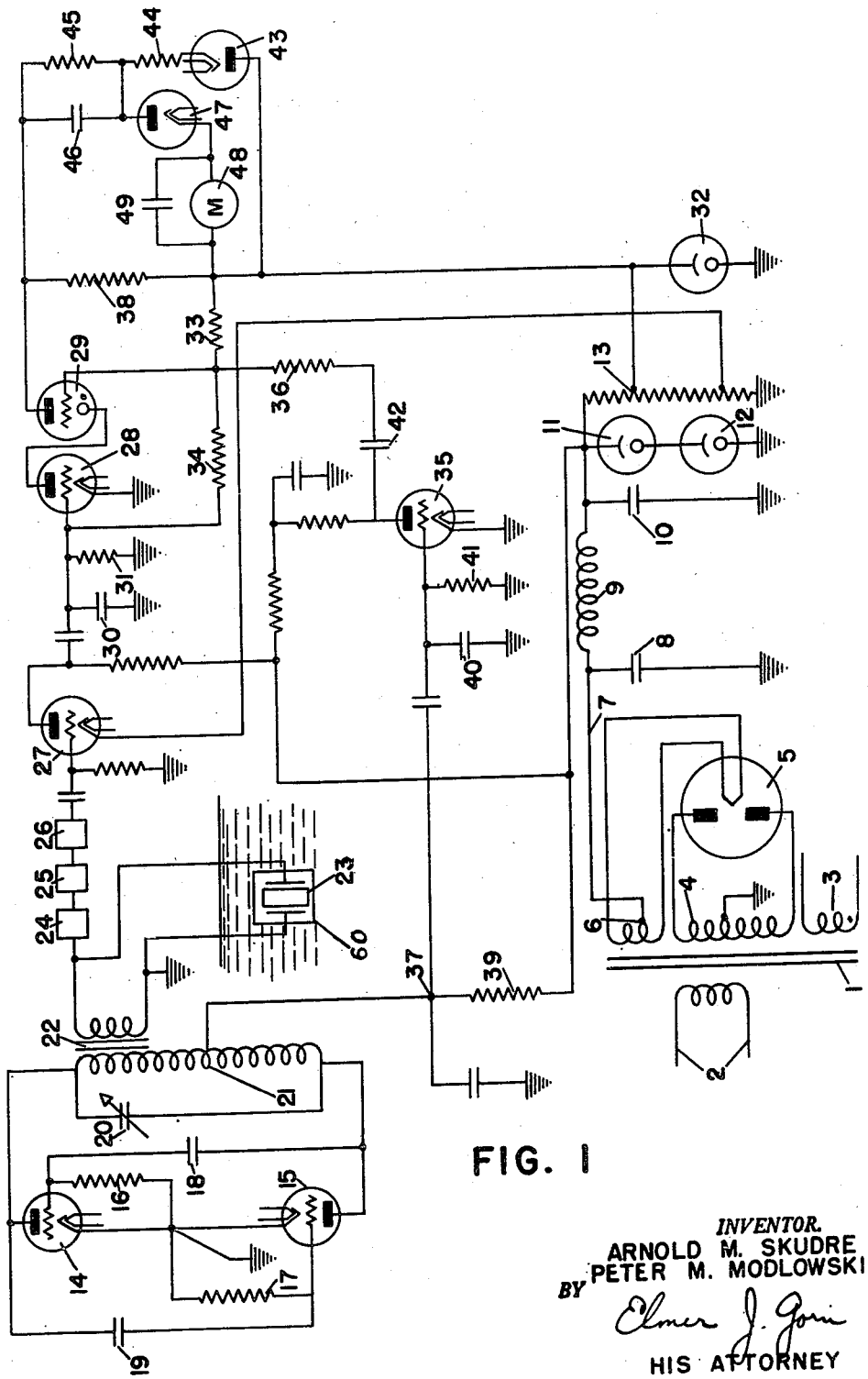

INVENTOR.
ARNOLD M. SKUDRE
PETER M. MODLOWSKI

March 7, 1950    P. M. MODLOWSKI ET AL    2,499,520
DISTANCE MEASURING DEVICE
Filed Jan. 31, 1947      2 Sheets-Sheet 2
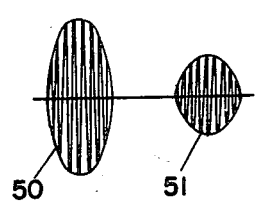
FIG. 2A
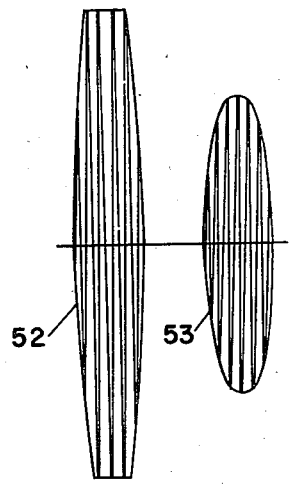
FIG. 2B
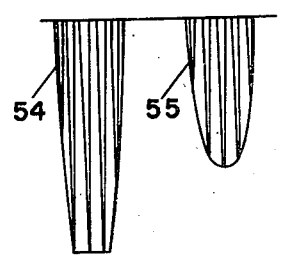
FIG. 2C
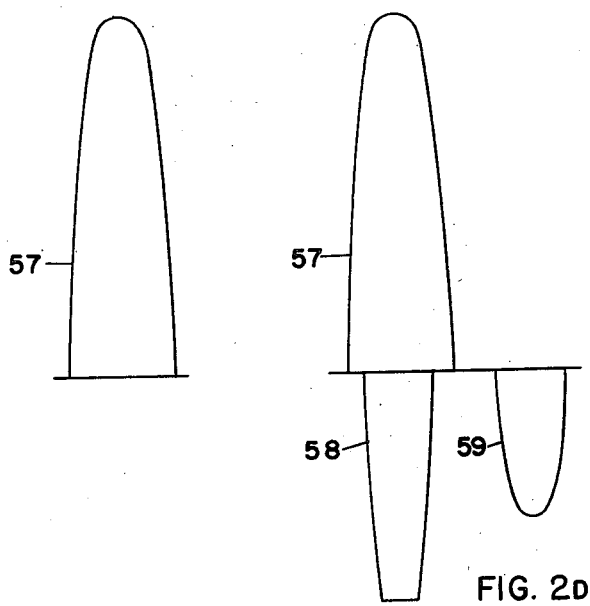
FIG. 2D
FIG. 2
INVENTOR.
ARNOLD M. SKUDRE
PETER M. MODLOWSKI
BY
HIS ATTORNEY Patented Mar. 7, 1950

2,499,520

UNITED STATES PATENT OFFICE 2,499,520

DISTANCE MEASURING DEVICE

Peter M. Modlowski, Fall River, and Arnold M. Skudre, Somerset, Mass., assignors to Raytheon Manufacturing Company, a corporation of Delaware Application January 31, 1947, Serial No. 725,482

6 Claims. (Cl. 177—386)

This invention relates to an improved method for distance measurement by the transmission of wave energy toward the object whose distance is to be measured, the reflection of the wave energy from the object, and the measurement of the time interval between the direct and the reflected wave. The method of the invention may be used for measuring distances in any medium and may utilize either compressional wave energy or electromagnetic wave energy. The invention is particularly suitable for the measurement of the depth of water beneath a vessel.

An important feature of the present invention is the use of a simple meter for the distance indicator. Indicators used in apparatus of this type are generally quite complicated and expensive. For example a cathode ray tube requiring intricate control circuits is commonly used. In the present invention, however, an ordinary microammeter is calibrated to read distance directly and serves as a convenient and relatively inexpensive distance indicator.

Circuits utilizing a meter for this purpose have been developed but may have the serious disadvantage that if for any reason echoes are not received, the meter will swing off scale. As a result, in the case of a depth indicator on a boat operating in shallow water, the operator of the boat will be led to believe he has moved into deep water when actually the boat may be running aground. It is an object of the present invention to provide a system wherein the meter will indicate zero distance whenever echoes are not received. The operator of a vessel in such a case will then be warned that echoes are not being received or the vessel is in dangerous waters.

A further object of the present invention is to provide an extremely compact distance indicator. The electronic gear of the present invention may be placed under or behind the instrument board of a small vessel while the meter indicating depth may be placed on the instrument board. Battery operation is possible with a small power pack as the current drain of the apparatus is very small.

Further advantages of the present invention will become apparent in the following description of an embodiment of the invention, reference being made to the accompanying drawings in which Figure 1 is a simple diagrammatic representation of an application of the invention particularly designed for measuring the depth of water beneath a ship; and Figure 2 shows the pulse shapes obtained in various parts of the circuit of Figure 1.

In this form of the invention, a pulsing circuit supplies pulses of energy to a projector and simultaneously feeds pulses directly into the receiving circuit. This causes a tube to fire, permitting a condenser in the plate circuit of the tube to charge through a resistance. When the reflected pulse is received by the receiver, the tube is cut off and the condenser is no longer charged. The period of time between the transmission of the direct pulse and the reception of the reflected pulse, during which the tube draws current, is proportional to the charge built up on the condenser, or to the current stored in the condenser. By discharging the condenser through an ammeter at the instant the tube is cut off, a current reading is obtained which is proportional to the depth of the water.

Referring to Figure 1 of the drawing, a conventional single phase, full wave, rectifying power supply is shown. An alternating current voltage is impressed across the primary of the supply transformer 1 at the terminals 2. A secondary winding 3 supplies the filaments of all the tubes in the system which may be connected in parallel. The high voltage winding 4 supplies the anodes of the rectifier 5, the cathode of which is connected to the secondary winding 6. Conductor 7 from the center tap of winding 6 carries the rectified voltage to the filter system 8, 9, 10. The voltage output of the filter system is regulated by the voltage regulator tubes 11 and 12. A voltage divider 13 between B+ to ground supplies the bias voltages and, when screen grid tubes (not illustrated) are used, the screen voltages for the system.

The vacuum triodes 14 and 15 with their associated resistors and condensers comprise the oscillating pulser in the nature of a multivibrator. Positive voltage is applied to the anodes of the tubes from B+ through resistor 39 and through the tuned circuit consisting of the condenser 20 and the coil 21. This circuit is tuned to 25 kilocycles or any other desired frequency. At the instant positive voltage is applied to the anodes, the grid bias of the tubes will be zero so that the tubes will draw current. This current will be an oscillating current of the resonant frequency of the tuned circuit 20, 21. As the plate current builds up, the grid current of the tubes causes the condensers 18 and 19 to charge, building up a negative bias on the grids which eventually cuts off the tubes. The time required for cut-off will be determined by the dynamic grid resistance of the tubes and the magnitude of condensers 18 and 19. As electrical energy is stored in the condenser 20 and coil 21, the oscillations of the plate circuits are not cut off instantly, when the tubes are cut off, but are damped out. The time required for the pulse to build up to its maximum value and to damp out again results in a pulse consisting of 25 kilocycle oscillations having an approximately symmetrical envelope sinusoidal in shape. The shape of this pulse is shown by 50 in Figure 2a. When the tubes have been cut off, the negative bias voltages stored on the condensers 18 and 19 leak off through the resistors 16 and 17 permitting the tubes to fire again at a time determined by the values of the condensers 18 and 19 and the resistors 16 and 17 thus setting the pulsing rate. A pulse rate should be used which will permit time for the return of the echo between pulses. A rate of six pulses per second is satisfactory for depth measurements of several hundred feet.

The pulses 50 produced in this way are fed through the transformer 22 into the hydrophone 23 supported in the case 60. This hydrophone may be of the Rochelle salt type or any other desired type. It serves both as a projector of the direct pulses and a receiver of the reflected pulses. It may be mounted in any convenient manner to the side or bottom of the boat below the water line, directed downward to measure depth or directed forward to determine the distance of obstructions in the path of the boat.

The pulses 50 produced by the tubes 14 and 15 and fed to the hydrophone 23 are also fed directly into the receiving amplifier of the apparatus. These pulses entering directly into the receiving amplifier from the pulser will hereafter be called "direct pulses." As stated, the hydrophone 23 not only acts as a projector but also as a receiver. The comparatively weak pulses it receives as "echoes" or "reflected pulses" shown as 51 in Figure 2a, are also introduced directly into the receiving amplifier. Distance is measured by determining the time interval between the introduction into the receiving amplifier of the direct pulses and reflected pulses as will be described.

The receiving amplifier may have three stages of amplification as indicated by the boxes 24, 25 and 26. The requirement here is that sufficient amplification be provided so that reflected signals obtained at the greatest depths it is desired to measure will be amplified sufficiently to provide the necessary magnitude of voltages for the system. At the same time, it is necessary that the direct signals, which are comparatively strong at the input of the amplifier, are not amplified too greatly. Therefore, stage 26 is operated as a conventional limiter as well as an amplifier, for the purpose of limiting the amplification of the direct pulses to a certain value. This value is determined by other circuit characteristics to be developed and so will be stated later. The appearance of the amplified and limited direct pulse and the amplified reflected pulse is shown by 52 and 53 respectively, of Figure 2b.

The amplified pulses are impressed on the grid of the vacuum triode 27. This tube is biased just beyond cut-off with a positive potential with respect to ground obtained from the voltage divider 13. Consequently the tube only conducts during the time the positive oscillations of the pulse are impressed on the grid, the tube operating as a detector. The output of the tube is a negative pulse represented by 54 for the direct pulse and 55 for the reflected pulse. Condenser 30 and resistor 31 in the grid circuit of the following tube 28 filter the 25 kilocycle oscillations of the pulses so that only the envelopes of the pulses represented by 58 and 59 in Figure 2d appear on the grid of this tube. The resistance, capacitance combination 30, and 31, also regulates the length of the pulses appearing on the grid of 28 which is important as will be seen. Vacuum triode 28 has a positive bias on its grid obtained from voltage divider 13 across the voltage regulator tube 32 and through the resistors 33 and 34. Consequently when anode voltage is applied to the tube, the tube conducts. Anode voltage is supplied tube 28 from voltage divider 13, across the voltage regulator tube 32 through resistor 38 and through the plate cathode circuit of the cold cathode gas triode 29. Thus anode voltage will only be supplied to tube 28 when series connected tube 29 is conducting. A positive bias is maintained on the grid of tube 29 from voltage divider 13 across the voltage regulator tube 32 through resistor 33, but is not quite sufficient to cause the tube to fire. The grids of tubes 28 and 29 are connected through the resistor 34, so that each grid receives the same signals.

The operation of the series connected vacuum tube 28 and gas tube 29 is therefore in the following manner: normally the tubes do not conduct as a positive voltage is required to trigger gas tube 29 through which the plate voltage of tube 28 is supplied. Whenever tube 29 is fired however, by the application of a positive voltage on its grid, plate voltage will be supplied tube 28 and both tubes will start to conduct and continue to conduct as the grid of vacuum tube 28 is positively biased. If a negative pulse is now applied to the grid of vacuum tube 28, both tubes will be cut off until the tube 29 is again fired. Positive pulses will thus cause the series connected tubes to start conducting and to continue conducting while negative pulses will completely stop conduction. It will be noted that in the system as described this far, there are no means for supplying a positive pulse to the grids of 28 and 29; whenever either a direct pulse from the pulser is fed into the receiving amplifier through the transformer 22, or a reflected pulse is fed into the receiving amplifier through the projector 23, this pulse will appear on the grids of tubes 28 and 29 as a negative pulse sufficient in magnitude to cut off tube 28 and the series connected tube 29.

It is necessary now to consider the nature of the signal impressed on the input of tube 35 from the mid tap of coil 21 of the pulsing oscillator. This signal is amplified by tube 35 and is impressed on the grids of tubes 28 and 29 through resistor 36 and provides the positive voltage required to trigger gas tube 29. As formerly explained, due to the build up time and damping time of the pulsing oscillator, the plate current in each of the tubes 14 and 15 during a pulse, builds up to a maximum and then damps out again. The flow of plate current through resistor 39 from the positive voltage source causes a voltage change at the junction point 37. As the tubes begin to draw current, the voltage at point 37 drops at a rate proportional to the build up time of the pulsing circuit and when the tubes are cut off, the voltage rises to its static value at a rate proportional to the damping time of the pulsing circuit. In this way a negative pulse 56 is produced which is amplified by tube 35.

The resistance capacitance combination 40 and 41 filters the input of tube 35 and controls the length of the pulses impressed on the grid of tube 35. The amplified pulse appears on the plate of tube 35 as a positive pulse 57 which is then impressed on the grids of tubes 28 and 29 through the coupling condenser 42 and resistor 36. In order for the system to operate properly this positive pulse must be greater in magnitude than any negative pulse from the receiving amplifier. It is this consideration that determines the voltage at which the limiter 26 is set to operate, so that limiter 26 is caused to limit amplification to a value less than that of the positive pulses produced by tube 35.

Therefore, whenever a direct pulse is sent into the receiving amplifier from the pulser, through the transformer 22, this pulse will appear on the grids of tubes 28 and 29 as a negative pulse 58. Simultaneously the negative pulse developed at junction 37 will be amplified by tube 35, appearing on the grids of 28 and 29 as a positive pulse 57 of greater magnitude. The RC combinations 40 and 41 and 30 and 31 controlling the lengths of these pulses are so chosen, that the negative pulse lengths will be shorter than the positive pulse lengths, as shown in Figure 2d. This compensates for any phase shift occurring in the receiving amplifier, so that the positive pulses will fully oppose the negative pulses and control the tubes. The net positive voltage resulting will fire gas tube 29, causing tubes 28 and 29 to conduct. However, when a reflected pulse is received by the hydrophone 23, the negative pulse 59 resulting on the grid of tube 28 will cut off the tubes 28 and 29. In the case of a reflected signal no corresponding pulse is developed from the hydrophone back through the transformer 22 and amplifier 35 as the impedance of this path is too great. Tubes 28 and 29 are thus caused to conduct during the time a direct pulse is sent out by the projector and the reflected pulse received, and are then cut off by the reflected pulse.

The interval of time between the transmission of a direct pulse and the reception of a reflected pulse, during which the tubes conduct, is a measure of the depth of the water and is indicated by the meter circuit connected in the plate circuit of tubes 28 and 29 in parallel with the plate resistor 38. When the tubes draw current, a part of the plate current flow from the voltage regulated supply is through plate resistor 38 and a part is through the parallel branch consisting of diode 43 and the resistors 44 and 45. The plate current flow through resistor 45 causes a voltage drop across the resistor 45 which charges the condenser 46. The rate at which the condenser charges will be determined by the resistance of resistor 44, resistor 45 and diode 43. These circuit values are so chosen that the condenser will not be fully charged in the interval between pulses. The charge built up on condenser 46, or the current stored by the condenser in the interval the tubes 28 and 29 are conducting, will therefore be proportional to the time the tubes conduct. At the instant the tubes are cut off by a reflected pulse, the current stored on the condenser is discharged through the diode 47 and the microammeter 48 and the resistance 38. The current flow through the charging resistor 45 across the condenser is negligible as its value is very large in relation to the resistance of the meter discharging path. The condenser 49 across the meter is charged by the surge of current through the meter, and then discharges through the meter after the surge, serving as a filter to maintain the average reading on the meter without appreciable fluctuations of the needle, even though the projector fails to pick up several reflected pulses. The meter is calibrated to read directly the depth of the water.

Various modifications of the apparatus and application of this invention will suggest themselves to those skilled in the art. For example, the invention may be used to measure distances in air as well as in water. If used in air, however, a different type projector preferably should be used and the invention might be further modified to utilize electromagnetic waves rather than compressional waves.

As the present invention is readily adaptable to many modifications, it is therefore desired that the appended claims be given a broad interpretation commensurate with the scope of this invention and limited only by the prior art.

Having now described our invention, we claim:

1. Apparatus for measuring distance by the time of travel method which comprises, means for transmitting and receiving a compressional wave pulse, a time measuring circuit, a vacuum tube and a gaseous tube, each with an anode, a cathode, and a control element, connected with their anode-cathode paths in series between the first named means and said measuring circuit, means connecting said control elements in parallel, means providing anode potential to one of said tubes and through said one tube when conductive to the other of said tubes, means providing a positive pulse to said control elements in response to the transmission of a compressional wave pulse, of sufficient magnitude to render both of said tubes conductive, and means providing a negative pulse to said control elements in response to the receipt of a compressional wave pulse, of sufficient magnitude to render at least said vacuum tube non-conductive.

2. Apparatus for measuring distance by the time of travel method which comprises, means for transmitting and receiving a compressional wave pulse, a time measuring circuit, a vacuum tube and a gaseous tube, each with an anode, a cathode, and a control element, means connecting the gaseous tube cathode to the vacuum tube anode, means connected to the gaseous tube anode for furnishing anode potential to both tubes, means biasing said vacuum tube to be in a conductive state when said anode potential is applied to the anode thereof via said gaseous tube, means connecting said measuring circuit to said gaseous tube anode, means connecting both of said control elements together, means providing a positive pulse to said control elements in response to the transmission of a compressional wave pulse, said positive pulse being of sufficient magnitude to render said gaseous tube conductive, and means providing a negative pulse to said control elements in response to the receipt of a compressional wave pulse, said negative pulse being of sufficient magnitude to render said vacuum tube non-conductive.

3. Apparatus for measuring distance by the time of travel method which comprises, means for transmitting and receiving a compressional wave pulse, a time measuring circuit, a vacuum tube and a gaseous tube, each with an anode, a cathode, and a control element, means connecting the gaseous tube cathode to the vacuum tube anode, means connected to the gaseous tube anode for furnishing anode potential to both tubes, means biasing said vacuum tube to be in a conductive state when said anode potential is applied to the anode thereof via said gaseous tube, means connecting said measuring circuit to said gaseous tube anode, means providing a positive pulse to the gaseous tube control element in response to the transmission of a compressional wave pulse, said positive pulse being of sufficient magnitude to render said gaseous tube conductive, and means providing a negative pulse to the vacuum tube control element in response to the receipt of a compressional wave pulse, said negative pulse being of sufficient magnitude to render said vacuum tube non-conductive.

4. Apparatus for measuring distance by the time of travel method which comprises, means for transmitting and receiving a compressional wave pulse, a time measuring circuit, a vacuum tube and a gaseous tube, each with an anode, a cathode, and a control element, means connecting the gaseous tube cathode to the vacuum tube anode, means connected to the gaseous tube anode for furnishing anode potential to both tubes, means biasing said vacuum tube to be in a conductive state when said anode potential is applied to the anode thereof via said gaseous tube, means connecting said measuring circuit to said gaseous tube anode, means connecting both of said control elements together, means providing a negative pulse to both of said control elements each time a compressional wave is transmitted or received, said negative pulse being of sufficient magnitude to render said vacuum tube non-conductive, and means providing a positive pulse to both of said control elements each time a compressional wave is transmitted, said positive pulse being of sufficient magnitude to overcome said negative pulse and render said gaseous tube conductive.

5. Apparatus for measuring distance by the time of travel method which comprises, means for transmitting and receiving a compressional wave pulse, a time measuring circuit, a vacuum tube and a gaseous tube, each with an anode, a cathode, and a control element, means connecting the gaseous tube cathode to the vacuum tube anode, means connected to the gaseous tube anode for furnishing anode potential to both tubes, means biasing said vacuum tube to be in a conductive state when said anode potential is applied to the anode thereof via said gaseous tube, means connecting said measuring circuit to said gaseous tube anode, means connecting both of said control elements together, a pulsed oscillator, means coupling said transmitting and receiving means to said oscillator and to said control elements, said coupling means providing a negative pulse to said control elements each time said oscillator is pulsed or a compressional wave pulse is received, said negative pulse being of sufficient magnitude to render said vacuum tube non-conductive, and means connected to said oscillator for providing a positive pulse to both of said control elements each time said oscillator is pulsed, said positive pulse being of sufficient magnitude to overcome said negative pulse and render said gaseous tube conductive.

6. Apparatus for measuring distance by the time of travel method which comprises, means for transmitting and receiving a compressional wave pulse, a vacuum tube and a gaseous tube, each with an anode, a cathode, and a control element, means connecting the gaseous tube cathode to the vacuum tube anode, means connected to the gaseous tube anode for furnishing anode potential to both tubes, means biasing said vacuum tube to be in a conductive state when said anode potential is applied to the anode thereof via said gaseous tube, means connecting both of said control elements together, means providing a positive pulse to said control elements in response to the transmission of a compressional wave pulse, said positive pulse being of sufficient magnitude to render said gaseous tube conductive, means providing a negative pulse to said control elements in response to the receipt of a compressional wave pulse, said negative pulse being of sufficient magnitude to render said vacuum tube non-conductive, a capacitor connected in circuit with the anode and cathode of said gaseous tube, said capacitor being dimensioned to become charged to a potential determined by the time said gaseous tube is conductive in each duty cycle, and a discharge circuit for said capacitor including a meter arranged to indicate said potential.

PETER M. MODLOWSKI.
ARNOLD M. SKUDRE.

REFERENCES CITED

The following references are of record in the file of this patent:

UNITED STATES PATENTS

| Number | Name | Date |
|---|---|---|
| 1,858,931 | Langevin et al. | May 17, 1932 |
| 2,012,837 | Tear | Aug. 27, 1935 |
| 2,101,076 | Laboureur et al. | Dec. 7, 1937 |
| 2,131,993 | Wittkuhns et al. | Oct. 4, 1938 |
| 2,275,930 | Torcheux | Mar. 10, 1942 |
| 2,301,196 | Bradford | Nov. 10, 1942 |
| 2,303,453 | Gulliksen | Dec. 1, 1942 |
| 2,346,093 | Tolson | Apr. 4, 1944 |

FOREIGN PATENTS

| Number | Country | Date |
|---|---|---|
| 406,592 | Great Britain | Mar. 1, 1934 |